(12) United States Patent
Murthy

(10) Patent No.: US 12,688,092 B1
(45) Date of Patent: Jul. 21, 2026

(54) MANAGEMENT SYSTEM RECOVERY OVER A BLUETOOTH INTERFACE

(71) Applicant: DELL PRODUCTS L.P., Round Rock, TX (US)

(72) Inventor: Hemanth Venkatesh Murthy, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/034,312

(22) Filed: Jan. 22, 2025

(51) Int. Cl.
*G06F 11/14* (2026.01)
*G06F 13/40* (2006.01)
*G06F 13/42* (2006.01)

(52) U.S. Cl.
CPC ........ *G06F 11/143* (2013.01); *G06F 11/1433* (2013.01); *G06F 13/4022* (2013.01); *G06F 13/4282* (2013.01); *G06F 2201/865* (2013.01); *G06F 2213/0042* (2013.01)

(58) Field of Classification Search
CPC .............. G06F 11/143; G06F 11/1433; G06F 13/4022; G06F 13/4282; G06F 2201/865; G06F 2213/0042; G06F 11/1417
See application file for complete search history.

(56) References Cited

U.S. PATENT DOCUMENTS 7,849,454 B2 * 12/2010 Lambert ............. G06F 11/1417
717/168
9,509,376 B2 * 11/2016 Ahmed .................... H04B 5/26
2014/0092806 A1 4/2014 Kidron et al.

FOREIGN PATENT DOCUMENTS

WO 20241 82961 A1 9/2024

* cited by examiner

*Primary Examiner* — Joseph R Kudirka
(74) *Attorney, Agent, or Firm* — Larson Newman, LLP

(57) ABSTRACT

An information handling system includes a BMC, a multiplexor, and a Bluetooth interface. A processor includes a first USB interface, and the BMC includes a second USB interface. The multiplexor includes a first data input coupled to the first BMC interface, a second data input coupled to the second USB interface, a control input coupled to the BMC, and an output. The Bluetooth interface is coupled to the output. The BMC selectably activates the control input in a first state to select the first USB interface to couple to the Bluetooth interface, and selectably activates the control input in a second state to select the second USB interface to couple to the Bluetooth interface.

20 Claims, 3 Drawing Sheets

100

100

MANAGEMENT SYSTEM RECOVERY OVER A BLUETOOTH INTERFACE

FIELD OF THE DISCLOSURE

This disclosure relates to information handling systems, and more particularly relates to the recovery of a management system in an information handling system over a Bluetooth interface.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a processor, a BMC, a multiplexor, and a Bluetooth interface. The processor may include a first USB interface, and the BMC may include a second USB interface. The multiplexor may include a first data input coupled to the first BMC interface, a second data input coupled to the second USB interface, a control input coupled to the BMC, and an output. The Bluetooth interface may be coupled to the output. The BMC may selectably activate the control input in a first state to select the first USB interface to couple to the Bluetooth interface, and selectably activate the control input in a second state to select the second USB interface to couple to the Bluetooth interface.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
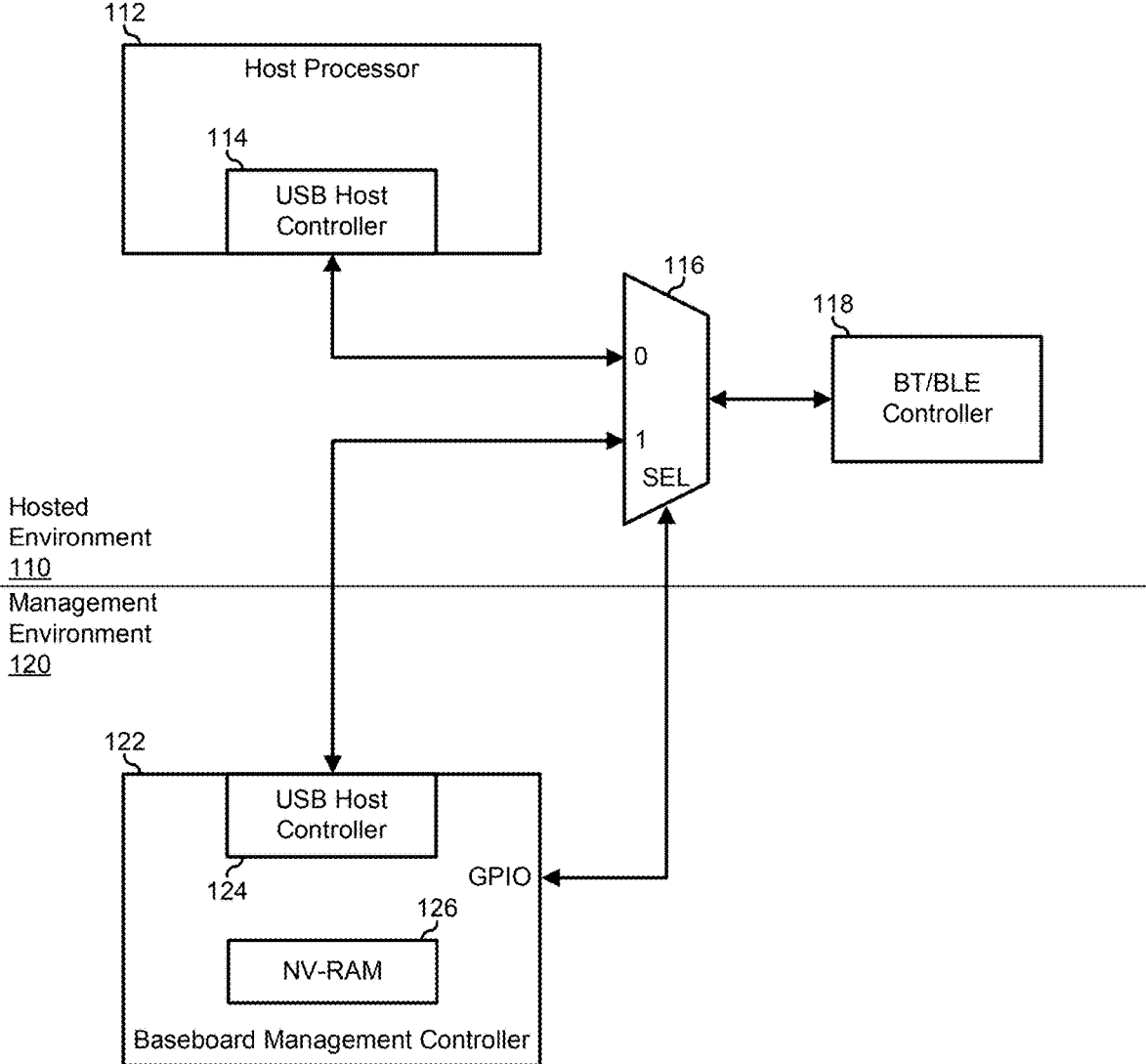
FIG. 1 illustrates an information handling system according to an embodiment of the present disclosure.

FIG. 1 illustrates an information handling system 100 including a hosted environment 110 and a management environment 120. Hosted environment 110 represents a processing environment instantiated on processing hardware of information handling system 100, such as a central processing unit (CPU) 112. In particular, hosted environment 110 provides the functions and features that are typically associated with a computer device, such as may be implemented by programs launched on an operating system (OS) instantiated on CPU 112. CPU 112 includes a Universal Serial Bus (USB) host controller 114. Hosted environment 110 further includes a multiplexor 116 and a Bluetooth/Bluetooth Low Energy (BT/BLE) controller 118. The signal traces of USB host controller 114 are connected to a first channel of multiplexor 116 (Channel 0), and the output of the multiplexor is connected to BT/BLE controller 118. In this way, when the first channel (Channel 0) of multiplexor 116 is selected, host processor 112 controls USB host controller 114 and has access to BT/BLE controller 118 to provide wireless connectivity for hosted environment 110.

Management environment 120 represents a processing environment instantiated on management hardware of information handling system 100, such as a baseboard management controller (BMC) 122. In particular, management environment 120 operates out-of-band from hosted environment 110 to provide monitoring, management, and maintenance of the hardware, functions, and features of information handling system 100. BMC 122 includes a USB host controller 124 and a non-volatile memory device (NV-RAM) 126 to store a working firmware image for the BMC. The monitoring, management, and maintenance of information handling system 100 are carried out by BMC 122 based upon the execution of the working firmware image. The signal traces of USB host controller 124 are connected to a second channel of multiplexor 116 (Channel 1). In this way, when the second channel (Channel 1) of multiplexor 116 is selected, BMC 122 controls USB host controller 124 and has access to BT/BLE controller 118 to provide wireless connectivity for management environment 120.

BMC 122 includes a general purpose input/output (GPIO) that is connected to a select (SEL) input of multiplexor 116. As such, BMC 122 operates to select whether host processor 112 or the BMC has operative control of BT/BLE controller. It will be understood that multiplexor 116 may be instantiated as a stand-alone device, or may be provided as a portion of a logic device associated with hosted environment 112. In a particular embodiment, multiplexor 116 is provided as an element of management environment 120, as needed or desired. Here, multiplexor 112 may be provided as a function that is provided by a logic device associated with management environment 120, such as a complex programmable logic device (CPLD), a field programmable gate array (FPGA), or the like.

It has been understood by the inventors of the current disclosure that BMCs are critical components of information handling systems such as information handling system 100. In particular, if the working firmware image associated with the BMC becomes corrupted, the information handling system may fail to boot or experience other operational issues. Thus, the associated NV-RAM typically stores a backup firmware image in addition to the working firmware image in order to allow firmware recovery. The backup firmware image is typically a full-featured copy of the working firmware image. However storing the backup firmware image typically necessitates a larger non-volatile memory to store two (2) versions of the full-featured firmware image (that is, the working firmware image and the backup firmware image), which increases the cost of the information handling system.

In a particular embodiment, the backup firmware image maintained on NVRAM 126 is a small firmware image, instead of the typical full-featured backup firmware image. This backup firmware image includes sufficient firmware code to initialize USB host controller 124, to select the second channel (Channel 1) of multiplexor 116, and to initialize BT/BLE controller 118 to provide access to the BT/BLE controller to the BMC. The backup firmware image can be invoked when a firmware update is ready for BMC 122, or when a firmware failure is identified. Then, the backup firmware image operates to download the full firmware image (i.e., the updated firmware image, or the restored firmware image, as needed), and to install the full firmware image to NV-RAM 126.

Figure 2:
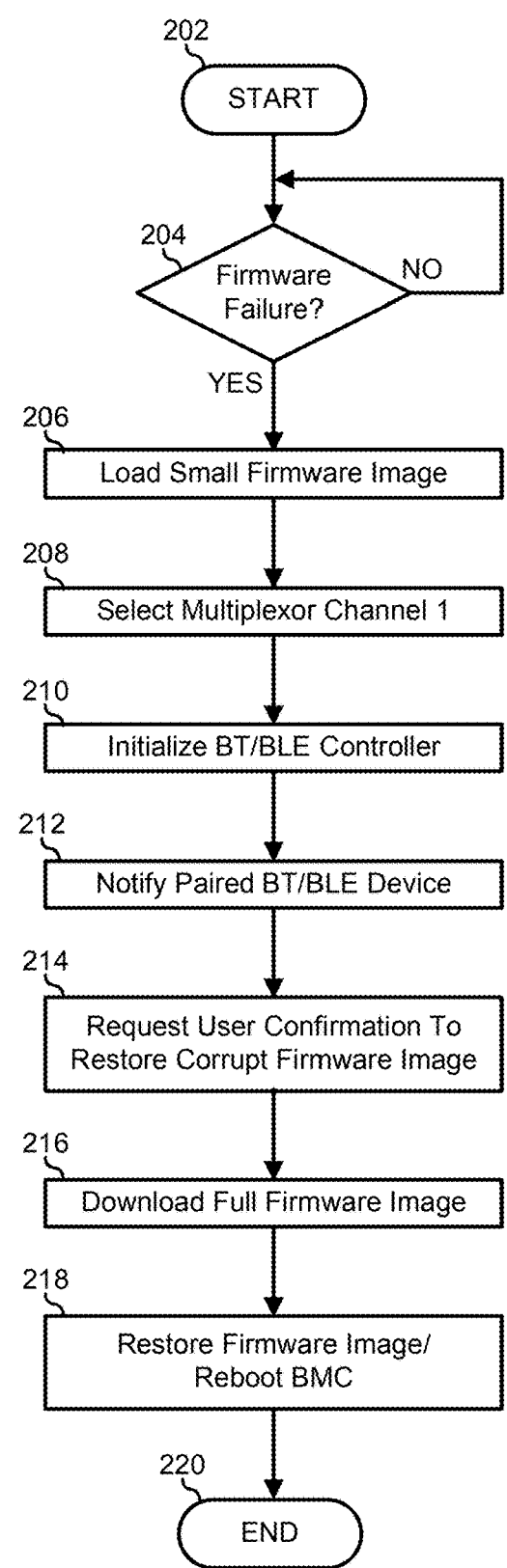
FIG. 2 illustrates a method for the recovery of a management system in an information handling system over a Bluetooth interface according to an embodiment of the present disclosure.

FIG. 2 illustrates a method 200 for the recovery of a management system in an information handling system over a Bluetooth interface, starting at block 202. A decision is made as to whether or not a firmware failure for a management environment is detected in decision block 204. If not, the "NO" branch of decision block 204 is taken and the method loops back to decision block 204 until a firmware failure is detected. When the firmware failure is detected, the "YES" branch of decision block 204 is taken and the small firmware image stored in the NV-RAM of the BMC is loaded in block 206. The small firmware image operates to select a multiplexor channel to select a USB host controller of the BMC to be connected to a BT/BLE controller of the information handling system in block 208. When the USB host controller is connected to the BT/BLE controller, the firmware image operates to initialize the BT/BLE controller in block 210, and any paired BT/BLE devices are notified that the BMC's USB host controller is connected to the paired device in block 212. A companion application that allows a user to interface with the management environment is accessed to confirm the user's intent to restore the corrupted firmware image in block 214. When the user confirms the intention to restore the corrupted firmware image, the new firmware image is downloaded from the BT/BLE interface in block 216. The downloaded firmware image is restored/reflashed to the NV-RAM and the BMC is rebooted in block 218, and the method ends in block 220.

Figure 3:
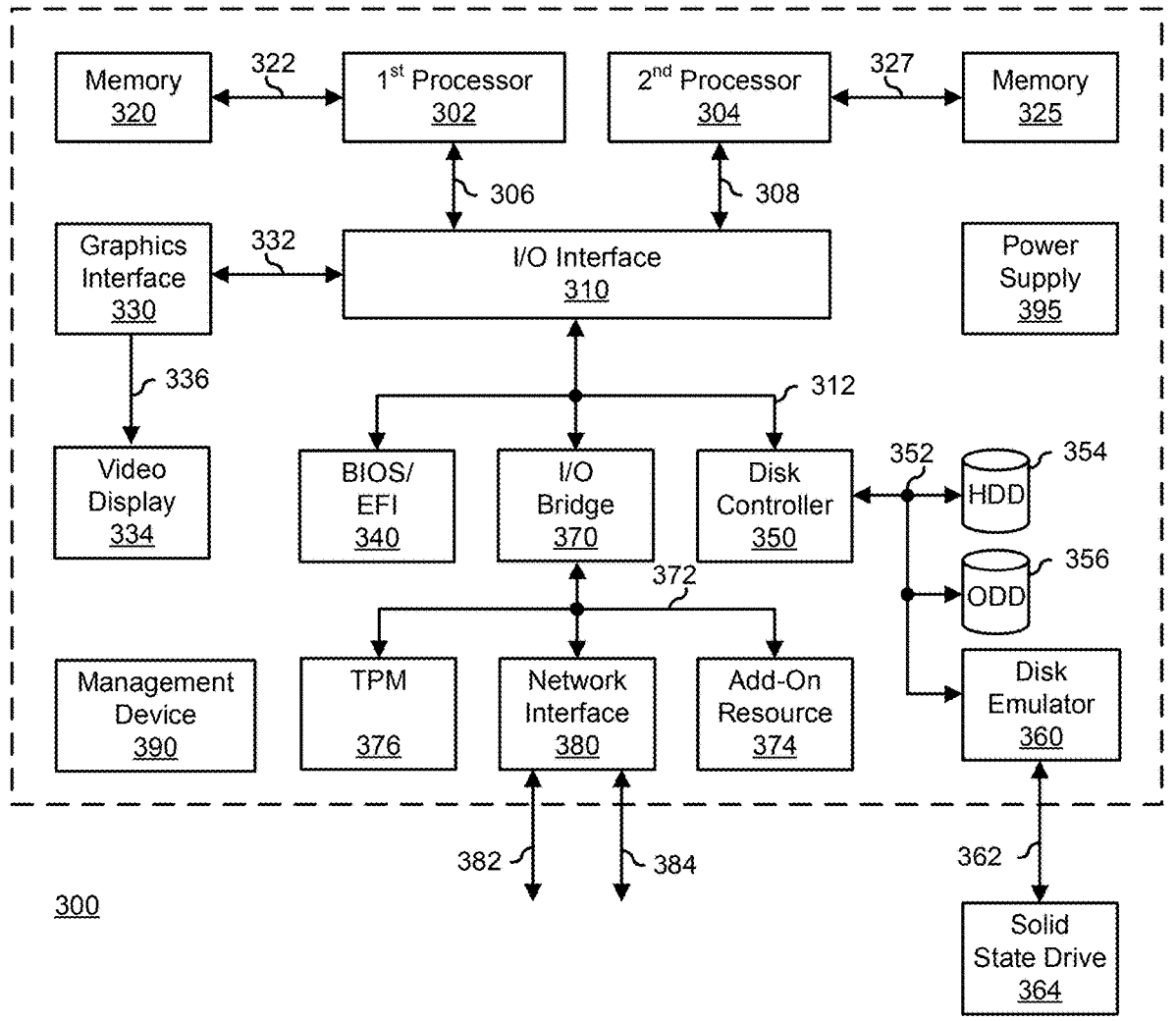
FIG. 3 is a block diagram illustrating a generalized information handling system according to another embodiment of the present disclosure.

FIG. 3 illustrates a generalized embodiment of an information handling system 300 similar to information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 where peripheral interface 372 and the I/O channel are of the same type, and the I/O bridge translates information from a format suitable to the I/O channel to a format suitable to the peripheral channel 372 where they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 where the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed:

1. An information handling system, comprising:
a processor including a first universal serial bus (USB) interface;
a baseboard management controller (BMC) including a second USB interface;
a multiplexor having a first data input coupled to the first USB interface, a second data input coupled to the second USB interface, a control input coupled to the BMC, and an output; and
a Bluetooth interface coupled to the output;
wherein the BMC is configured to selectably activate the control input in a first state to select the first USB interface to couple to the Bluetooth interface.

2. The information handling system of claim 1, wherein the BMC is configured to selectably activate the control input in a second state to select the second USB interface to couple to the Bluetooth interface.

3. The information handling system of claim 2, wherein the BMC further includes a first firmware image and a second firmware image.

4. The information handling system of claim 3, wherein the BMC is further configured to detect that the first firmware image is corrupted.

5. The information handling system of claim 4, wherein the BMC is further configured to launch the second firmware image in response to detecting that the first firmware image is corrupted.

6. The information handling system of claim 5, wherein the second firmware image is configured to activate the control input to select the second USB interface to couple to the Bluetooth interface.

7. The information handling system of claim 6, wherein the second firmware image is further configured to download a third firmware image from the Bluetooth interface.

8. The information handling system of claim 7, wherein the second firmware image is further configured to store the third firmware image to a non-volatile memory device of the information handling system.

9. The information handling system of claim 8, wherein the second firmware image is further configured to reboot the BMC based on the third firmware image.

10. The information handling system of claim 1, wherein the Bluetooth interface includes a Bluetooth Low Energy (BLE) interface.

11. A method comprising:
providing, on an information handling system, a first universal serial bus (USB) interface;
providing, on the information handling system, a baseboard management controller (BMC) including a second USB interface;

providing, on the information handling system, a multiplexor having a first data input coupled to the first USB interface, a second data input coupled to the second USB interface, a control input coupled to the BMC, and an output;
providing, on the information handling system, a Bluetooth interface coupled to the output; and
selectably activating, by the BMC, the control input in a first state to select the first USB interface to couple to the Bluetooth interface.

12. The method of claim 11, further comprising selectably activating, by the BMC, the control input in a second state to select the second USB interface to couple to the Bluetooth interface.

13. The method of claim 12, wherein the BMC further includes a first firmware image and a second firmware image.

14. The method of claim 13, further comprising detecting, by the BMC, that the first firmware image is corrupted.

15. The method of claim 14, further comprising launching, by the BMC, the second firmware image in response to detecting that the first firmware image is corrupted.

16. The method of claim 15, wherein the second firmware image is configured to activate the control input in the second state to select the second USB interface to couple to the Bluetooth interface.

17. The method of claim 16, wherein the second firmware image is further configured to download a third firmware image from the Bluetooth interface.

18. The method of claim 17, wherein the second firmware image is further configured to store the third firmware image to a non-volatile memory device of the information handling system.

19. The method of claim 18, wherein the second firmware image is further configured to reboot the BMC based on the third firmware image.

20. An information handling system, comprising:
a first universal serial bus (USB) interface;
a baseboard management controller (BMC) including a second USB interface;
a multiplexor having a first data input coupled to the first USB interface, a second data input coupled to the second USB interface, a control input coupled to the BMC, and an output; and
a Bluetooth interface coupled to the output, wherein the Bluetooth interface includes a Bluetooth Low Energy (BLE) interface;
wherein the BMC is configured to selectably activate the control input in a first state to select the first USB interface to couple to the Bluetooth interface, and to selectably activate the control input in a second state to select the second USB interface to couple to the Bluetooth interface.

* * * * *